United States Patent [19]
Ekhoff

[11] Patent Number: 6,097,568
[45] Date of Patent: Aug. 1, 2000

[54] AIR DAMS POSITIONED BETWEEN SPINNING DISKS FOR REDUCING THE VIBRATION IN A DATA STORAGE DEVICE

[76] Inventor: Donald L. Ekhoff, 15105 Concord Cir., Morgan Hill, Calif. 95037

[21] Appl. No.: 09/129,471

[22] Filed: Aug. 4, 1998

[51] Int. Cl.[7] .................................................. G11B 33/14
[52] U.S. Cl. ........................................................ 360/97.02
[58] Field of Search ............................... 360/97.01–99.12

[56] References Cited

U.S. PATENT DOCUMENTS

| | | | |
|---|---|---|---|
| 3,846,835 | 11/1974 | Horowitz | 360/98 |
| 4,879,618 | 11/1989 | Iida | 360/106 |
| 5,036,416 | 7/1991 | Mastache | 360/105 |
| 5,541,791 | 7/1996 | Yamasaki et al. | 360/105 |

OTHER PUBLICATIONS

Douglas Huntley, Ph.D. and Jim Baker, 3M Company, "Selection and Placement of Recirculation Filters in Disk Drives," *IDEMA Insight*, May/Jun. 1998, pp. 9, 33–34.

S. Jimmy Hwang, 3M Bonding Systems Division, "Noise and Vibration Control Technology in Hard Disk Drives," May 13, 1998, pp. 1–4.

Jeff McAllister, Hewlett Packard, "Disk flutter: Causes and potential cures," *Data Storage*, May/Jun. 1997, pp. 29–30.

*Primary Examiner*—A. J. Heinz
*Attorney, Agent, or Firm*—Terry McHugh

[57] ABSTRACT

A vibration-reduction device for a disk drive includes providing air dams that regulate air intake and air expulsion relative to gaps between adjacent data disks of a disk stack. In the preferred embodiment, the dams are formed by a number of arrays of fingers, with each gap between adjacent data disks receiving a finger from each of the arrays. The fingers within a gap are spaced apart to partition the gap into air flow cells. The fingers cleave circulating air from the gap before the air has sufficient rotational velocity to expel itself as a result of centrifugal force. Thus, the air is expelled in a controlled manner that retards aerodynamic forces having sufficient energy to induce vibration of the disks. In another embodiment, each finger of an array has a configuration that defines nonuniform clearances between the finger and each data disk on the opposite sides of the finger. For example, each finger may have a cross section in which the dimension of the leading edge is greater than the dimension of the trailing edge, with the leading edge being forward of the trailing edge with respect to the direction of disk rotation. This geometry reduces the likelihood that local turbulence will induce aerodynamic forces having a sufficient magnitude to induce disk vibration. Other geometries that provide nonuniform finger-to-disk clearance may be substituted, particularly if disk rotation is bidirectional.

18 Claims, 4 Drawing Sheets

AIR DAMS POSITIONED BETWEEN SPINNING DISKS FOR REDUCING THE VIBRATION IN A DATA STORAGE DEVICE

TECHNICAL FIELD

The invention relates generally to reducing the vibration of one or more disks in a data storage device and more particularly to interrupting circumferential air flow near the surface of one or more spinning disks to reduce vibration of the spinning disks.

BACKGROUND ART

Data storage devices employing one or more rotating disks on which data is recorded are well known and are often referred to as disk drives. Disk drives provide a relatively low cost means for storing and accessing data. Typically, each disk includes magnetically recordable material on the opposed surfaces of a substrate. Each surface is divided into a number of concentric data tracks and each data track is further divided into a number of track sectors capable of storing a set quantity of information. Data is accessed by positioning a magnetic head over a selected data track while the disk is rotating. The magnetic head can then read or write data to or from track sectors of that data track. The magnetic heads are typically biased against the surface of the disk such that, as the disk rotates, a magnetic head "flies" on an air film above the disk.

One goal in the design of disk drives is to decrease seek time, which is defined as the average time that is required for the disk drive to find and access selected data. One means for decreasing seek time is to cause the rotating disks to spin more quickly. Increasing the rotational speed relative to the magnetic heads allows the magnetic heads to read or write to more data sectors in a given amount of time. Rotational speeds greater than 10,000 rpm are desired.

A concern with increasing the rate of disk rotation is that the increase in rotational speed is typically accompanied by an increase in vibration experienced by the disks. As data track widths become increasingly narrow, even small vibrational movements of the disks can cause the magnetic heads associated with the disks to become temporarily misaligned, causing read and/or write errors.

Many of the different sources of disk vibration can be categorized as mechanical sources relating to rotationally driving the stack of data disks. For example, a drive mechanism may include ball bearings for the purpose of providing a low-friction assembly, but the assembly still includes bearing-to-surface relative movements that induce vibrations. The vibrations may resonate through the elements of the drive mechanism and significant vibrations will be imparted to the disks. As a result, the performance of read and write operations are adversely affected.

Other sources of disk vibration may be categorized as aerodynamic. For example, as data disks of a disk stack are rotated, air in the gaps between adjacent disks is dragged along with the rotating disks and is accelerated outwardly toward the edges of the disks by centrifugal forces. The accelerated air is propelled from the cavities between the disks in an unorganized or random pattern. The rapid departure of pockets of air results in a low pressure region between adjacent disks that is then filled by air rushing to eliminate the vacuum. A discharge cycle causing chaotic and random flutter of the disks is created when the temporary vacuum causes a flex phase during which portions of the edges of the adjacent disks flex toward each other, followed by a release phase caused by air refilling the vacuum. The refilling may also result in relative overpressure, causing the disks to temporarily spread apart beyond the desired distance. This cycle occurs repeatedly and randomly in the gaps between all of the disks, and becomes increasingly significant as the disks of disk drives are spun more rapidly, are made increasingly thin, and are positioned increasingly closer together.

Disk drive designers have incorporated vibration-retarding mechanisms into current devices. One approach to offsetting the mechanical sources is to introduce vibration dampers, such as a damping polymer, at locations that are selected to reduce the likelihood that vibrations will transfer from one part to the next. Another approach is to replace ball bearings with fluid bearings, but improvements to the design of fluid bearings are needed.

An approach to reducing the effects of the aerodynamic sources is to form the disks of a more rigid substrate material, so that the disks are less likely to flex. However, this approach often leads to an increase in the cost of the disks.

What is needed is a device that at least reduces the vibrational instability often associated with high speed disk drives.

SUMMARY OF THE INVENTION

A disk drive vibration-reduction device includes providing air dams which regulate air intake and air expulsion relative to gaps between adjacent data disks of a disk stack. The air dams are formed by at least one array of fingers, with each gap between adjacent data disks receiving a finger of the array. In the preferred embodiment, there are at least two arrays of fingers, so that the gap between adjacent data disks includes two fingers that partition the gap into air flow cells. Additional arrays may be added to ensure that there are a sufficient number of air flow cells to cleave circulating air from a particular gap before the air has sufficient rotational velocity to expel itself as a result of centrifugal force. If there are three arrays, each gap between adjacent data disks will include three fingers, such that three air flow cells are defined.

In another embodiment, the air dams are formed by a single array of fingers in which each finger has a varying thickness, as measured in the same direction as the distance between adjacent disks. The varying thickness defines non-uniform clearances between a finger and each data disk on the opposite sides of the finger. For example, each finger may have a cross section in which the dimension of the leading edge is greater than the dimension of the trailing edge. The leading edge is forward of the trailing edge with respect to the direction of disk rotation. If the disks are rotated in only one direction, a cross section of a finger may have a shape of a truncated triangle in which a base of the triangle is the leading edge. The clearances between the finger and the rotating disks will then increase with distance from the leading edge. This reduces local turbulence between the rotating disks and the finger and also reduces windage losses by increasing the average clearance between the finger and the rotating disks. For applications in which the fingers are to be used with a disk drive that provides bidirectional rotation of the disks, other cross sectional shapes may be preferred. Quadrilateral, oval and circular cross sections have been contemplated. In a most preferred embodiment of the invention, there are multiple arrays of fingers having the turbulence-reducing cross sectional configuration.

Each array defines a comb-like structure that is fixed in position. The arrays do not interact with any other structures, either aerodynamically or mechanically. However, at least one of the arrays may include a filter for removing free particles from the housing in which the disk stack resides. The fingers may be configured to direct the cleaved air flow to the filter, so that the air filtering mechanism is efficiently implemented. Preferably, a finger occupies 30% to 80% of the distance between two data disks.

The air dams have been tested in use with magnetic data disks, but the invention may be used in other applications, such as with rotating optical disks. An advantage of the invention is that the aerodynamic and mechanical independence of the vibration-reducing device allow the device to be used inexpensively and without risk of generating particles. Another advantage is that the vibration reduction is achieved at all rotational speeds.

DETAILED DESCRIPTION

The invention is a device for use in association with a typical disk drive employing one or more rotating disks for storing digital data. Each disk in the disk drive is coated with a magnetic material that stores data in concentric tracks that may be divided into sectors. However, the invention may be equally usable on disks comprising an optical or magneto-optical data storage surface. Furthermore, the invention is equally usable on read-write media and read only media.

Figure 1:
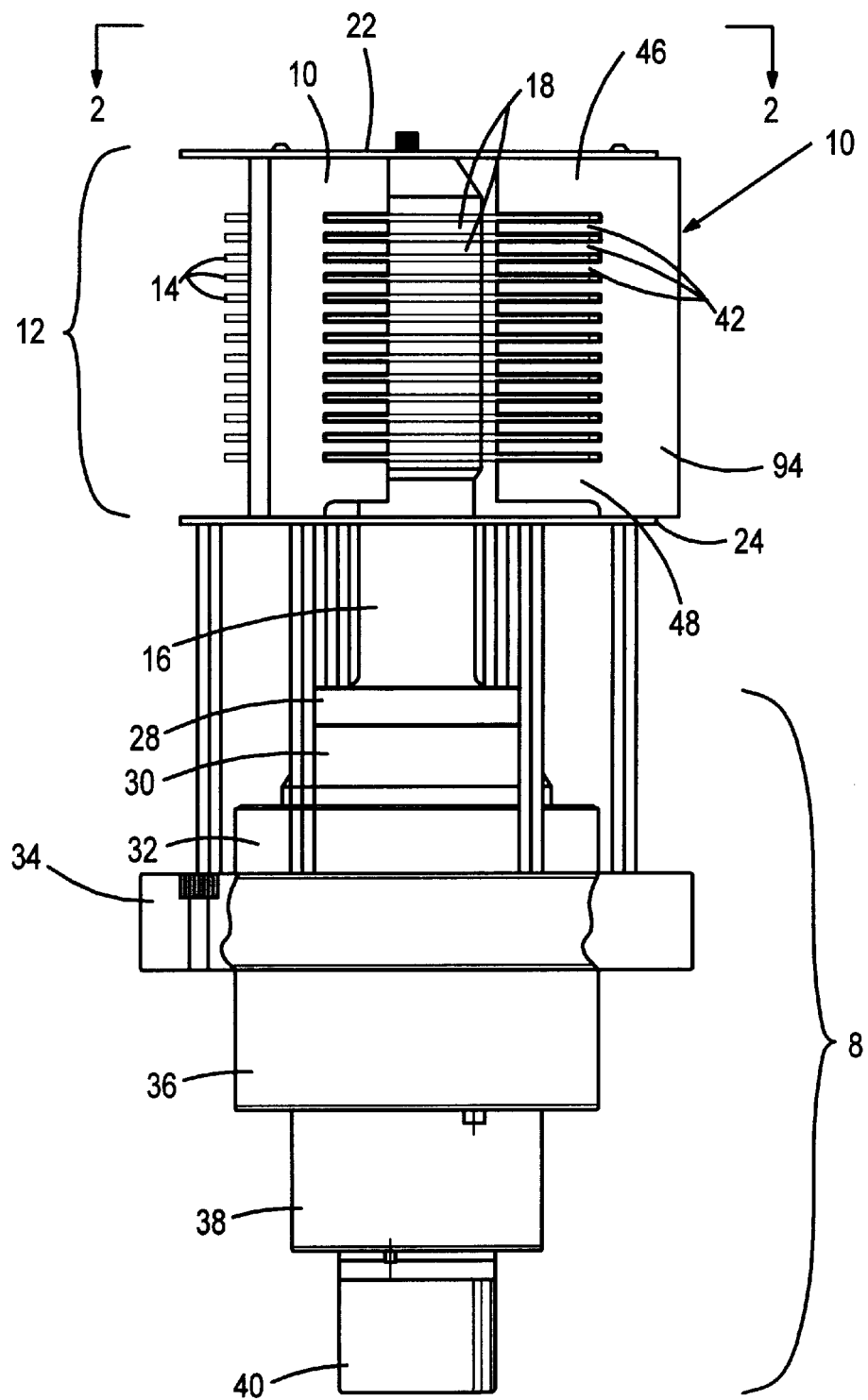
FIG. 1 shows a side view of a disk drive configured for testing or servo writing, including the vibration-reducing air dam of the invention.
Figure 2:
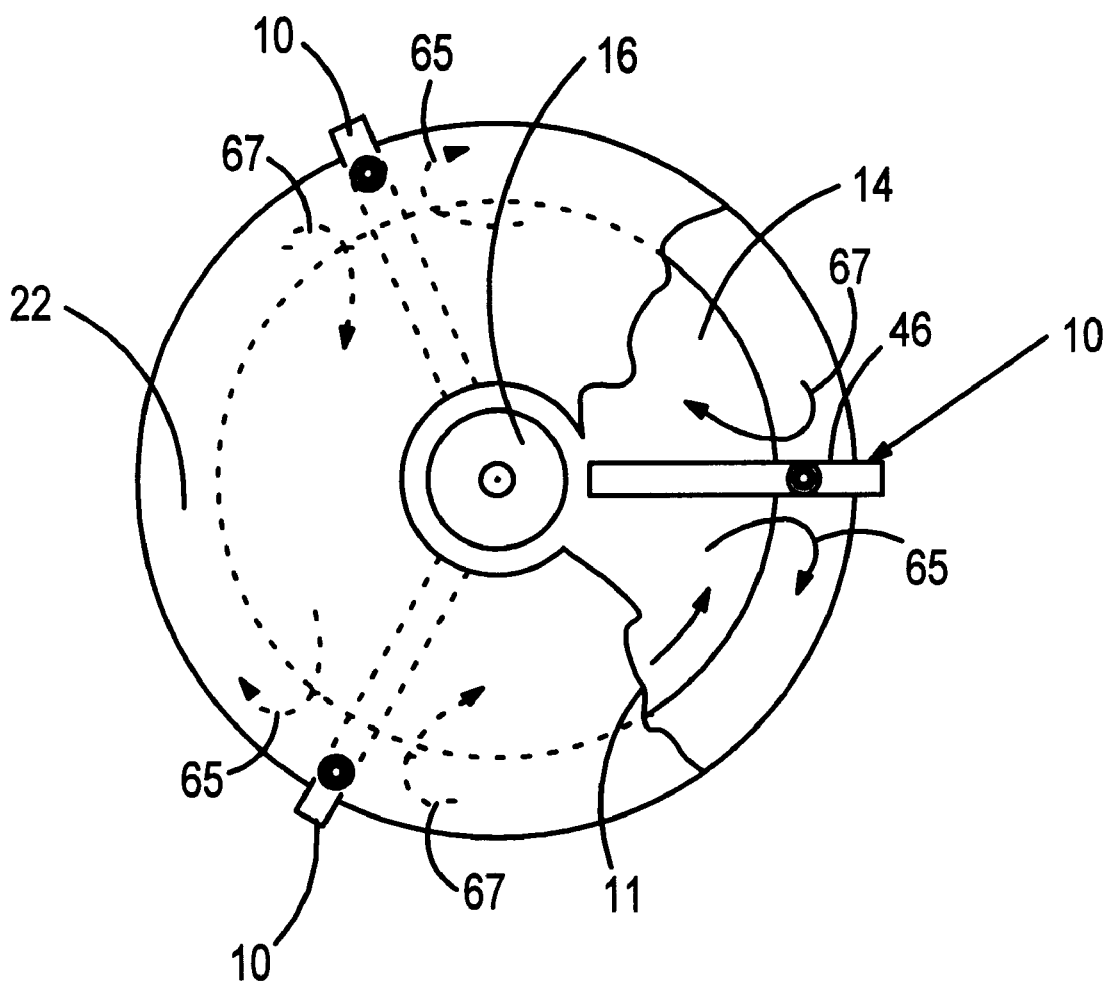
FIG. 2 shows a partial cut-away top view taken along lines 2—2 of FIG. 1, with three vibration-reducing air dams.

FIG. 1 depicts a side view of a motor assembly 8 and a disk assembly 12 configured for testing or servo writing, showing the vibration-reducing air dam 10 of the invention. A top view is shown in FIG. 2. In both of the illustrations, a portion of the housing has been removed, as indicated by the meandering line 11 in FIG. 2. The disk assembly 12 includes a number of disks 14 coupled to a hub adapter 16. The disks are arranged in parallel planes along the length of the hub adapter 16 and perpendicular to the axis of the hub adapter 16. Spacers 18 are positioned between each disk 14 to maintain the spacing and orientation of the disks 14. For example, FIG. 1 shows thirteen disks 14 coupled to the hub adapter 16, but the number of disks 14 is not critical to the invention. The gaps between the disks 14 are also not critical to the invention, but must be sufficiently large to accommodate the support arms which position the data access heads (e.g., magnetic heads) between the disks to write to or access data from the surfaces of the disks 14. Currently, the typical gap between disks in disk assemblies ranges between 2.54 mm and 3.175 mm. A housing surrounds the disk assembly. Only the lower housing wall 24 and a portion of the upper housing wall 22 are visible in FIGS. 1 and 2.

In the embodiment shown, the lower end of the hub adapter 16 extends through the lower housing wall 24, and is coupled to the electric motor assembly 8. The actual motor assembly configuration is not critical to the invention. However, the motor assembly 8 depicted in FIG. 1 includes a mounting flange 28 coupled to the end of the hub adapter 16 opposite the disks 14. The hub adapter 16 is also coupled to an upper thrust plate 30, which is further coupled to a stator enclosed within upper and lower stator housings 32 and 34. A lower thrust plate is enclosed within a lower thrust plate housing 36. An electric motor resides in a motor housing 38 coupled to the lower thrust plate housing 36, and finally, an optical encoder 40 is coupled to the electric motor housing 38. The electric motor is preferably a brushless direct-current three-phase motor, although other motors may be substituted.

The electric motor assembly 8 provides rotational force to the hub adapter 16. Typical prior art disk drive speeds currently range between 7,500 and 11,000 rpm. Higher speeds of rotation are desirable in order to decrease seek time. However, disk rotation speeds higher than 7,500 per minute have been found to encounter discharge cycle vibration problems that may interfere with proper functioning of the disk drive, resulting from air trapped between adjacent disks 14 being pulled by frictional contact with the rotating disks 14 and accelerated outward toward the edges of the disks 14 by centrifugal forces. The accelerated air is projected from the gaps between disks 14 in an unorganized or random pattern. The rapid departure of pockets of air creates unpredictable low pressure regions between a pair of adjacent disks 14. These low pressure regions are then filled by air rushing to eliminate the vacuum. A flex phase of the discharge cycle is created when a temporary vacuum causes portions of the edges of two adjacent disks 14 to flex toward each other, followed by a release phase in which air refilling the vacuum allows relaxation of the disks. The same cycle occurs randomly in the gaps between all of the disks 14. Flexing of 300 micro inches and greater has been observed at rotation speeds of up to 20,000 rpm.

The air dam 10 reduces or eliminates vibrations resulting from this aerodynamic source of vibrations by periodically interrupting the circumferential flow of air carried by the spinning disks 14. The air dam 10 is preferably configured as a comb-like structure comprising at least one finger 42, and preferably an array of fingers 42, with one finger projecting into each gap between adjacent disks 14 in the disk drive. As seen in FIGS. 1 and 2, more than one air dam 10 may be used to partition each gap into air flow cells. In embodiments using more than one air dam 10, the air dams 10 may be separate elements, or configured as a part of a single unitary body extending around or over the disk assembly 12. However, the fingers that project into each gap are spaced apart from each other to define the air flow cells.

In a preferred configuration, three air dams 10 are used. However, in alternate embodiments any number of arrays of fingers may be used. In FIG. 1, one of the three air dams is shown as including a finger support bracket 44, an upper flange 46 extending over the upper surface of the top disk 14, a lower flange 48 extending below the lower surface of the bottom disk 14, and an array of fingers 42 cantilevered from the finger support bracket 44, with a free end of each finger 42 extending into a gap between disks 14. The air dams 10 can be positioned at any desired location around the circumference of the disks 14, but the desired locations are limited primarily by the existence of other structures associated with the disks 14 (e.g., read/write heads) with which the air dams 10 may conflict. The air dams 10 are preferably comprised of zinc or aluminum, and preferably include an alodine coating. However, any materials appropriate for use in a disk assembly environment may be used. In the test configuration shown in FIG. 1, the air dam 10 is coupled to the upper and lower housing walls 22 and 24. However, in alternate embodiments, it is possible to couple the air dam 10 to any convenient structure associated with the disk assembly 12 or the housing enclosing the disk assembly 12, including the side wall (seen in FIG. 2) of the housing.

Figure 3:
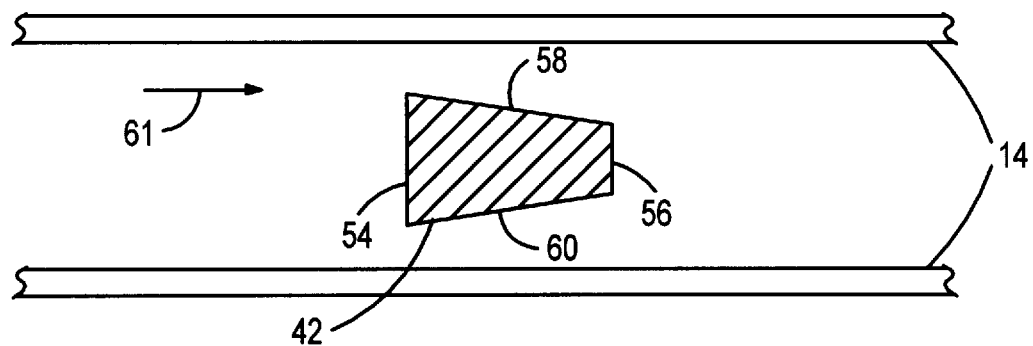
FIGS. 3 and 4 are alternative embodiments of a cross section of a finger of the vibration-reducing air dam of FIG. 1.

Alternate embodiments may not include the upper and lower flanges 46 and 48, which are not necessary to the function of the invention at disk rotation speeds below 20,000 rpm, because during testing the uppermost disk surface and the lowermost disk surface of the disk stack have not been observed to create the random expulsions of pockets of air observed in the gaps between pairs of disks 14. FIG. 3 depicts a cross section of a preferred embodiment of a finger 42 of the air dam 10. The finger 42 includes a leading edge 54, a trailing edge 56, an upper side 58, and a lower side 60. The leading edge 54 is shown as substantially flat and perpendicular to the planes of the disks 14. The height of the leading edge 54 preferably extends across 30% to 80% of the width of the gap between the surfaces of the adjacent disks 14. The disks rotate in the direction indicated by arrow 61, such that the shape of the finger provides expanding clearances between the upper and lower sides 58 and 60 of the individual fingers 42 and the surfaces of the disks. This geometry generates pressure gradients along the upper and lower sides 58 and 60 of the fingers 42. Each pressure gradient aids in the regulation of air flows along the surfaces of the disks, simultaneously defining turbulence-retarding air evacuation patterns and allowing passage of a thin film of air along the surface of the disk 14, so that a magnetic head is supported on an air bearing. Different pressure gradients may be appropriate for different planned operational rotation speeds of the disk assembly 12. The thickness of the trailing edge 56 is preferably less than the thickness of the leading edge 54. Thus, the upper and lower sides 58 and 60 are shown sloping from the leading edge 54 to the trailing edge 56 to form a tapered cross section. The tapered cross section is preferred because it may reduce turbulence between the rotating disks 14. Reducing turbulence between the rotating disks 14 may result in less windage, which is defined herein as the circumferential air flow near the rotating disks 14. Windage losses result from the aerodynamic resistance of the air to the rotation of the disks 14 and the energy expenditure required to accelerate the air.

Figure 4:
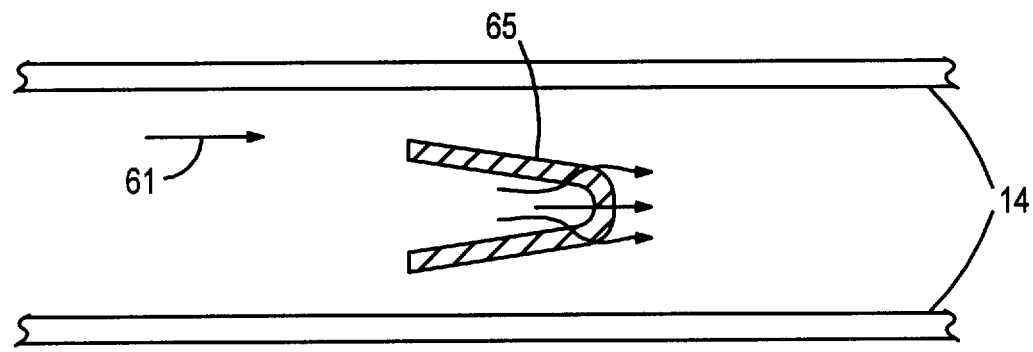

FIG. 4 illustrates an embodiment in which at least a portion of each finger 65 has a U-shaped configuration and is formed of a filter material for removing particles from the air flow. For example, the fingers may be formed from pressed/sintered polypropylene. This allows the fingers to perform the double duty of directing flow paths and removing potentially damaging particles from the flow paths.

In alternate embodiments, other shapes or configurations for fingers 42 of FIGS. 1 and 2 may be desirable. For example, the cross section of the fingers 42 may be round, quadrilateral, polygonal, oval, or triangular. Different shapes than that depicted in FIG. 3 may provide different or additional benefits. Furthermore, in alternate embodiments it may be desirable to provide the fingers 42 with differing cross sectional shapes at different points along the length of the fingers 42. Moreover, it may be desirable to vary the width of the clearances between the disks 14 and the upper and lower surfaces 58 and 60 of the fingers 42 along the lengths of the fingers 42.

The size of the gap between the end of each finger 42 and the outer surface of the hub adapter 16 is preferably between 0.5 and 4 millimeters. A gap of 2 millimeters has been found acceptable in prototype tests. The size of the gap between the edge of each disk 14 and the finger support bracket is preferably between 0.5 and 6 millimeters. However, in both cases, larger gaps may be possible without significantly reducing the effectiveness of the invention.

In the embodiment seen in FIGS. 1 and 2, the fingers 42 are positioned to project approximately radially relative to the hub adapter 16. However, in alternate embodiments, the fingers 42 may be positioned at any desirable angle relative to the hub adapter 16. Furthermore, in the embodiments seen in FIGS. 1 and 2, the fingers 42 are shown as roughly straight. In alternate embodiments, the fingers 42 may be curved or bent.

In use, the fingers of the air dam 10 of FIG. 2 extend between each pair of adjacent disks 14, which are rotated in the direction indicated by arrow 63. Air carried between the disks 14 encounters an air dam 10 and is prevented from obtaining sufficient rotational velocity to be randomly expelled from gaps between adjacent disks 14 by centrifugal forces. Instead, the air pressure near the leading edge 54 of the air dam 10 builds and the air tends to flow in a controlled manner, following a path along the air dam 10 and toward the edges of the spinning disks. A recirculating or steady state pattern of air flow may occur wherein, after the air is expelled from the gap between the disks 14, the air flows between the housing side walls and the edge of the spinning disks 14 in a direction opposite to the direction of spin, and then enters the gap between adjacent disks 14 some distance back from the leading edge 54 of the air dam 10, before being circulated again by the spinning disks 14 until the air dam 10 is again encountered. This recirculation for each of three air cells is represented by arrows 65 and 67 in FIG. 2.

Figure 5:
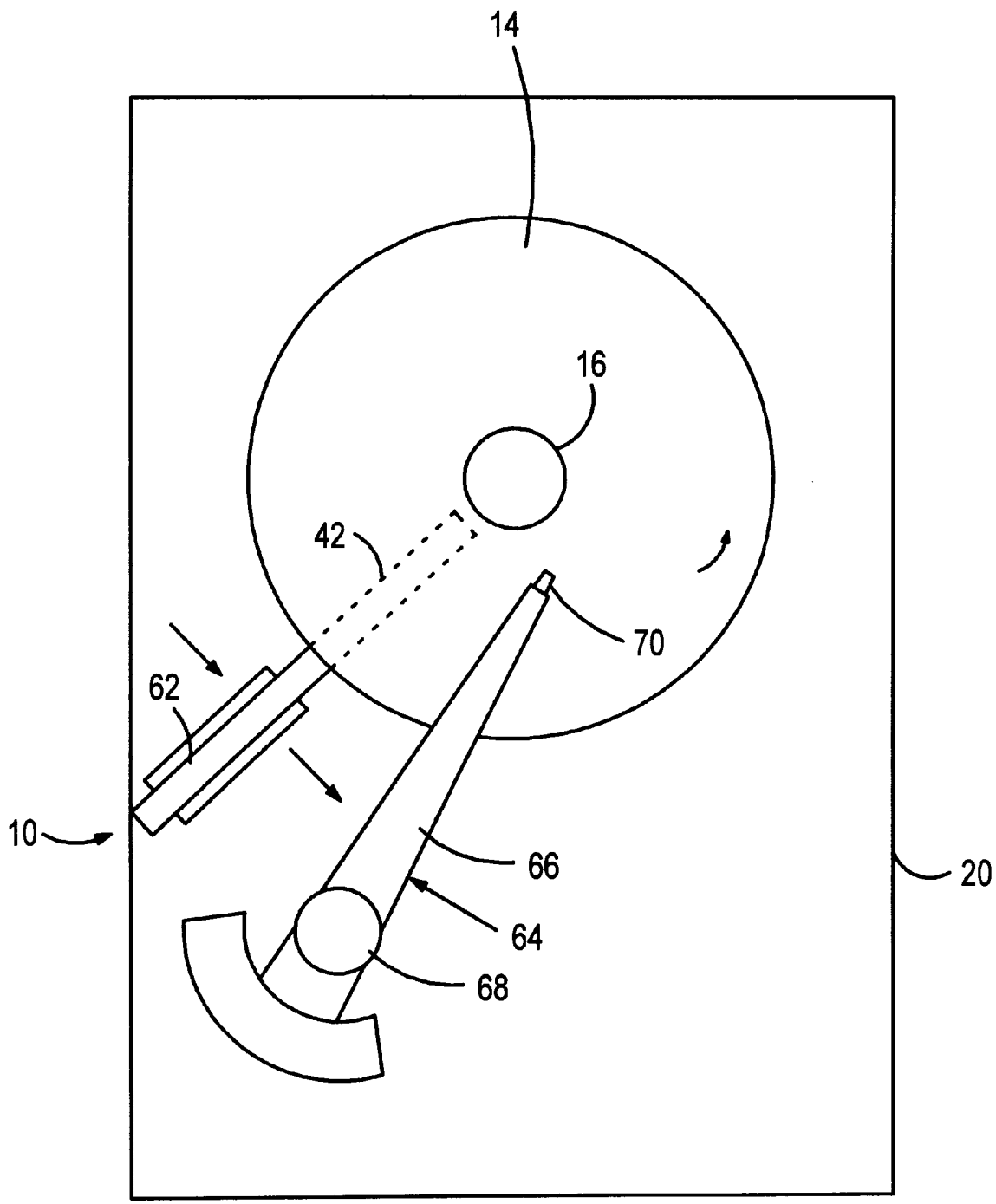
FIG. 5 shows a top view of an embodiment of the vibration-reducing air dam of FIG. 1, including an air filter portion.

In another embodiment, the finger support bracket 44 may include a filter, such as the pleated filter 62 shown in FIG. 5. The filter 62 may be a permeable membrane filter, an electrostatic filter, or any other acceptable filter or filter material. However, it is important to balance the filter efficiency against the pressure gradient created between opposite sides of the filter 62. Typically, very effective filters will produce a high pressure gradient. If the pressure gradient is too high, only a low volume of air will pass through the filter 62. A somewhat less efficient filter 62 may provide superior filtration, if it filters a significantly higher volume of air.

FIG. 5 shows a top view of a disk drive with an air dam 10 that includes the filter 62 positioned in an aperture in the finger support bracket. Only one air dam 10 is shown, but other air dams could be included, which may or may not also include a filter 62. In the embodiment shown, the fingers 42 are not used to guide air toward the filter 62, although the fingers 42 could be configured to do so. Rather, the embodiment depicted in FIG. 5 relies on the pressure differential between the leading edge and the trailing edge of the finger 42 to force air through the filter material. In embodiments that include a filter 62, the size of the gap between the end of each finger 42 and the outer surface of the hub adapter 16, and the size of the gap between the edge of each disk 14 and the finger-support structure should be minimized in order to hinder air flow that does not pass through the filter 62.

In some embodiments of the air dam 10, there may be some benefit to positioning the magnetic heads between the adjacent disks 14, and immediately adjacent to the trailing edges of the fingers 42. Referring to FIG. 4, the magnetic head assembly 64 comprises an actuator body 68 for moving an array of magnetic head support arms 66, each having a magnetic head 70 coupled to one end. The magnetic head support arms 66 are interleaved between adjacent disks 14 to read or write data from or to the disk 14 surfaces. Air turbulence between adjacent disks 14 can cause the magnetic head support arms 66 to vibrate. However, while the disks 14 are rotating, the air immediately behind the fingers 42 is at a lower air pressure and at a lower energy level than air in regions further away from the fingers 42. Therefore, less turbulence is likely to be encountered by structures positioned within the low pressure region than structures located elsewhere. By positioning the magnetic head 70 and magnetic head support arms 66 at least partially within the low pressure region behind the fingers 42, it may be possible to reduce the amount of vibration experienced by the magnetic head assembly 64.

What is claimed is:

1. A disk drive vibration-reduction device for use with a stack of data disks which are rotated about a common axis, adjacent data disks being spaced apart to form a gap therebetween, said vibration-reduction device comprising:

an array of first fingers arranged such that each said gap between adjacent data disks receives one of said fingers; and an array of second fingers arranged such that each said gap between adjacent data disks receives one of said second fingers;

wherein with respect to each said gap, said first and second fingers are spaced apart to partition said gap into a plurality of air flow cells.

2. The vibration-reduction device of claim 1 further comprising an array of third fingers arranged such that each said gap between adjacent data disks receives one of said third fingers, said third fingers being spaced apart from said first and second fingers to partition each said gap into at least three air flow cells, each of said first, second and third fingers being stationary and being inactive.

3. The vibration-reduction device of claim 1 wherein said first and second fingers are at least partially formed of air-filtration material for removing particles.

4. The vibration-reduction device of claim 1 wherein each said array has a comb-like configuration and is stationary.

5. The vibration-reduction device of claim 1 wherein a cross section of each of said first and second fingers varies in measurement with respect to a dimension that is perpendicular to major surfaces of said data disks, said cross sections being generally aligned with circumferential edges of said data disks.

6. The vibration-reduction device of claim 5 wherein said cross section has a shape of a truncated triangle, each said first and second finger having opposed leading and trailing edges, said leading edge being forward of said trailing edge with respect to a direction of rotation of said data disks, said leading edge having a greater measurement of said dimension than said trailing edge.

7. The vibration-reduction device of claim 5 wherein said cross section has a shape of one of a quadrilateral, a circle and an oval.

8. The vibration-reduction device of claim 1 wherein each said first and second finger traverses a portion of the distance between said adjacent data disks, said portion being in the range of 30% to 80%.

9. The vibration-reduction device of claim 1 wherein at least one of said arrays is connected to a support structure having a filter, air flow within said gap being directed to said filter by said at least one array.

10. The vibration-reduction device of claim 1 wherein said first and second fingers within a particular one of said gaps are on opposite sides of a read/write head, said data disks being magnetic disks.

11. A disk drive comprising:

a plurality of coaxial data disks, each data disk having an inside diameter and an outside diameter, said data disks being spaced apart to provide a gap between adjacent data disks;

drive means for rotating said data disks;

read means extending into said gaps for accessing data from major surfaces of said data disks; and air dam means for regulating air intake and air expulsion from said gaps, said air dam means including a first array of first fingers projecting into said gaps, each said first finger having a dimensionally varying thickness as measured in a same direction as the distance between said adjacent data disks, said varying thickness forming nonuniform clearances between said first fingers and said adjacent data disks into which said first fingers project, said first fingers being stationary relative to said data disks and said read means.

12. The disk drive of claim 11 wherein each said first finger has a cross section having a shape of a truncated triangle, thereby defining said varying thickness.

13. The disk drive of claim 12 wherein each said first finger has a larger leading edge than a trailing edge, said leading edge being forward of said trailing edge with respect to a direction of rotation defined by said drive means.

14. The disk drive of claim 11 wherein said air dam means includes a second array of second fingers projecting into said gaps such that each said gap includes a first and a second finger.

15. The disk drive of claim 14 wherein said second fingers are substantially identical to said first fingers with respect to said varying thickness.

16. The disk drive of claim 14 wherein said air dam means includes a third array of third fingers projecting into said gaps such that each said gap includes equidistantly spaced first, second and third fingers.

17. The disk drive of claim 11 wherein each said first finger has a cross section having a shape of a quadrilateral, an oval or a circle.

18. A disk drive vibration-reduction device for use with a stack of data disks which are rotated about a common axis, adjacent data disks being spaced apart to form a gap therebetween, said vibration-reduction device comprising:

an array of stationary and inactive first fingers arranged such that each said gap between adjacent data disks receives one of said fingers; and an array of stationary and inactive second fingers arranged such that each said gap between adjacent data disks receives one of said second fingers;

wherein with respect to each said gap, said first and second fingers are spaced apart to partition said gap into a plurality of air flow cells.

* * * * *